(12) United States Patent
Nagashima et al.

(10) Patent No.: US 8,927,638 B2
(45) Date of Patent: Jan. 6, 2015

(54) POLYPROPYLENE RESIN COMPOSITION

(75) Inventors: Hiroaki Nagashima, Shizuoka-Ken (JP); Kayo Kikuchi, Shizuoka-Ken (JP)

(73) Assignee: Suzuki Motor Corporation, Hamamatsu-shi, Shizuoka-Ken (JP)

( * ) Notice: Subject to any disclaimer, the term of this patent is extended or adjusted under 35 U.S.C. 154(b) by 0 days.

(21) Appl. No.: 14/113,995

(22) PCT Filed: Mar. 26, 2012

(86) PCT No.: PCT/JP2012/057719
§ 371 (c)(1),
(2), (4) Date: Oct. 25, 2013

(87) PCT Pub. No.: WO2012/160869
PCT Pub. Date: Nov. 29, 2012

(65) Prior Publication Data
US 2014/0045985 A1 Feb. 13, 2014

(30) Foreign Application Priority Data
May 26, 2011 (JP) .................................. 2011-117914

(51) Int. Cl.
| | | |
|---|---|---|
| C08K 3/08 | (2006.01) | |
| B60C 1/00 | (2006.01) | |
| C08L 23/12 | (2006.01) | |
| C08L 53/02 | (2006.01) | |
| C08L 23/10 | (2006.01) | |
| C08K 5/00 | (2006.01) | |
| C08K 5/20 | (2006.01) | |
| C08K 5/523 | (2006.01) | |

(52) U.S. Cl.
CPC ............. C08L 23/12 (2013.01); C08L 53/02 (2013.01); C08L 23/10 (2013.01); C08K 5/0008 (2013.01); C08K 5/0083 (2013.01); C08K 5/20 (2013.01); C08K 5/523 (2013.01); C08L 2201/10 (2013.01)

USPC .......................................... 524/441; 524/526

(58) Field of Classification Search
CPC ....................................................... C08L 23/12
USPC ........................................................... 524/441
See application file for complete search history.

(56) References Cited

U.S. PATENT DOCUMENTS

| | | | |
|---|---|---|---|
| 2005/0119392 A1* | 6/2005 | Makagawa et al. ........... | 524/451 |
| 2009/0295023 A1* | 12/2009 | Nagashima ................... | 264/219 |

FOREIGN PATENT DOCUMENTS

| | | | |
|---|---|---|---|
| JP | 04170452 | 6/1992 | |
| JP | 06172593 | 6/1994 | |
| JP | 08020684 | 1/1996 | |
| JP | 08157656 | 6/1996 | |
| JP | 10298366 | 11/1998 | |
| JP | 2005179455 | 7/2005 | |
| JP | 2005179455 A * | 7/2005 | ............. C08L 23/10 |
| JP | 2009062526 A | 3/2009 | |
| JP | 2010106201 A | 5/2010 | |

OTHER PUBLICATIONS

Translation of JP 2005-179455, Jul. 7, 2005.*
Search Report for International Patent Application No. PCT/JP2012/057719; Jun. 19, 2012.

* cited by examiner

*Primary Examiner* — Hui Chin
(74) *Attorney, Agent, or Firm* — Barnes & Thornburg LLP

(57) ABSTRACT

A polypropylene resin composition, including 75-90 wt. % of polypropylene resin as a matrix, 7-15 wt. % of hydrogenated styrene-butadiene-styrene copolymer elastomer (A) having a styrene content of 18-42 wt. %, and 3-10 wt. % of hydrogenated styrene-butadiene-styrene copolymer elastomer (B) having a styrene content of 12-15 wt. %. The polypropylene resin composition has an excellent scratch resistance compatible with impact resistance, and outstanding melt-moldability and is suitable for providing a colored-resin molding compound.

8 Claims, No Drawings

POLYPROPYLENE RESIN COMPOSITION

PRIORITY CLAIM

This patent application is a U.S. National Phase of International Patent Application No. PCT/JP2012/057719, filed 26 Mar. 2012, which claims priority to Japanese Patent Application No. 2011-117914, filed 26 May 2011, the disclosures of which are incorporated herein by reference in their entirety.

TECHNICAL FIELD

The present invention relates to a polypropylene resin composition suitable for use as a coating-free resin molding material because of a compatible combination of impact resistance and scratch resistance.

BACKGROUND ART

In recent years, omission of coating after injection molding of a colored resin is becoming popular for production of resinous automotive parts from viewpoints of cost reduction and/or environmental consideration. Particularly, as omission of coating has become possible due to improvement in mold technology etc. also for silver-metallic color parts for which omission of coating was difficult because of technical difficulty such as the occurrence of a weld line, application to versatile product parts is expanded. The omission of coating is desirable, for example, for interior resin parts of automobiles or four-wheel cars, such as an instrument panel garnish, a door trim garnish, and a shift garnish, for the purpose of cost cutting or reduction of a volatile organic compound (VOC). As a coating-free resin material, AES resin (acrylonitrile-ethylene-styrene resin, or acrylonitrile/ethylene-propylene-diene/styrene resin) has preferable characteristics from the viewpoints of colorability, scratch resistance, light resistance, etc. (Patent document 1). However, the AES resin has low flowability, and is therefore unsuitable for shaping of large-sized parts or elongated parts, and also its application to parts has been restricted since it has inferior impact resistance or chemical resistance.

Therefore, coating-free parts of polypropylene-based resin (hereafter, also referred to as "PP(-based) resin") which is excellent in flowability (melt-moldability), impact resistance, and chemical resistance had been desired, but it is inferior in colorability and scratch resistance because of a low surface hardness, so that commercial production thereof has been restricted. More specifically, the conventional material designing of PP-based resin in automotive application has been principally made of a ternary system based on ICP (impact polymer) formed of ethylene-propylene copolymer rubber (hereafter, sometimes also referred to as "EPR") and blended with an elastomer and an inorganic filler such as talc so as to provide a compatibility between impact resistance and rigidity. However, ICP becomes opaque due to inclusion of an EPR component, and becomes further cloudy by adding an inorganic filler, such as talc. Coloring by inclusion of a colorant or a luminous material is advantageously achieved if the base resin has a better transparency, the material designing based on the ternary system provides only white-blurred color which is poor in aesthetic appearance, so that it has not been suitable for providing a high luminosity color, such as silver-metallic color. Further, although the scratch resistance is advantageously attained at a higher surface hardness, the material designing based on the ternary system is caused to have a lower hardness due to the EPR component, and is liable to be scratched or marred easily. Furthermore, when talc is added, the scratched part is further conspicuously whitened. For these reasons, the conventional PP-based resin has been restrictively adopted for parts which are seldom touched by human hands after applying crimp processing for improving scratch resistance. For the parts requiring higher scratch resistances and aesthetic appearance, such as an instrument panel garnish and a shift garnish, such a measure as by crimping alone is insufficient. Therefore, it is a current practice that AES resin having a high surface hardness and excellent colorability has been more frequently adopted as a coating-free resin although it is problematic in flowability and formability.

PRIOR ART DOCUMENTS

Patent Documents

[Patent document 1] JP-A 2010-106201,
[Patent document 2] JP-A 2009-62526.

SUMMARY OF THE INVENTION

Problems to be Solved by the Invention

A principal object of the present invention is to provide a polypropylene resin composition suitable for use as a coating-free molding resin material by having the scratch resistance which is compatible with impact resistance.

Means for Solving the Problems

Having been developed in order to achieve the above-mentioned object, the polypropylene resin composition of the present invention, comprises: 75-90 wt. % of polypropylene resin as a matrix, 7-15 wt. % of hydrogenated styrene-butadiene-styrene copolymer elastomer (A) having a styrene content of 18-42 wt. %, and 3-10 wt. % of hydrogenated styrene-butadiene-styrene copolymer elastomer (B) having a styrene content of 12-15 wt. %.

As described above, the conventional coating-free polypropylene resin composition is based on a design concept that a PP resin is blended with an elastomer to improve the impact resistance, and is blended with an inorganic filler, such as talc, to increase the hardness and improve the modulus of elasticity. In contrast thereto, according to a study of the present inventors, it has been discovered that if a polypropylene resin is blended with two types of hydrogenated styrene-butadiene-styrene copolymer elastomers (A) and (B) having specific styrene contents, in combination, an impact resistance is attained, and moreover, while the surface hardness (Rockwell hardness) decreases a little, the scratch resistance is rather increased, as represented by a smaller lightness difference (ΔL*) due to whitening and a smaller residual scratch depth of a shaped test piece surface before and after crosscutting in a crosscut(or grid)-pattern test according to JIS K5600 adopted as a practical scratch-resistance examination. Based on the above finding, the present invention provides a polypropylene resin composition suitable for use as a coating-free molding resin material, which has a scratch resistance in combination with impact resistance, while avoiding the inconvenience in resin coloring accompanied by including inorganic filler, such as talc.

EMBODIMENTS OF THE INVENTION

Hereinbelow, the polypropylene resin composition of the present invention will be described in order with respect to preferred embodiments thereof. In the following description, "ratio(s)", "%", and "part(s)" used with reference to composition are all by weight, unless otherwise noted specifically.
(Polypropylene Resin)

It is preferred that the polypropylene resin which is a principal component in the composition of the present invention preferably comprises homo-polypropylene (h-PP) having high rigidity and high surface hardness. An ethylene-propylene block copolymer (b-PP) has a low transparency, can provide an inferior color tone of the resultant resin composition depending on its color, and is liable to lower the rigidity and surface hardness, so that it is preferably not contained and, even if contained, the content thereof should preferably be restricted to at most 10%, more preferably at most 5%. The polypropylene resin may preferably show a melt flow rate of 10-100 g/10 min., particularly 20-70 g/10 min., as measured at 230° C. under a load of 2.16 kg according to JIS K7210.

The polypropylene resin may be used in an amount occupying 75 to 90%, preferably 80 to 88%, of the resin in the composition. Below 75%, it becomes difficult to fully demonstrate the outstanding flowability and chemical resistance inherent to a polypropylene resin composition, and in excess of 90%, it becomes difficult to attain an improved impact resistance.

(Hydrogenated Styrene-Butadiene-Styrene Copolymer Elastomer)

As principal components for improving the Charpy impact strength of the polypropylene resin composition of the present invention, two types of hydrogenated styrene-butadiene-styrene copolymer elastomers (A) and (B) having different styrene contents, are used. These elastomers are both obtained by hydrogenation of styrene-butadiene-styrene block copolymers having different styrene contents, and with progress of the hydrogenation, they may have a composition of a styrene-butadiene-butylene-styrene copolymer or a styrene-ethylene-butylene-styrene copolymer. In the present invention, these are inclusively referred to as rene copolymer or a styrene-ethylene-butylene-styrene copolymer.tion, they may The hydrogenated styrene-butadiene-styrene copolymer elastomers may preferably have a degree of hydrogenation of the unsaturated double bond resulting from butadiene of 90-mol % or more, particularly 95-mol % or more.

The hydrogenated styrene-butadiene-styrene copolymer elastomer (A) having a styrene content of 18 to 42% is added in order to provide an improvement in Charpy impact strength, while suppressing the decreases of rigidity (bending modulus of elasticity) and surface hardness. If the styrene content is below 18%, the effect of suppressing the decrease of rigidity (bending modulus of elasticity) and surface hardness is insufficient, and if it exceeds 42%, the effect of improving the Charpy impact strength and the colorability will become scarce. One having a styrene content of 18 to 30% is particularly preferred. The elastomer (A) may be used in a proportion of 7 to 15%, preferably 8 to 12%, of the resins in the composition. At less than 7%, it becomes difficult to suppress the decreases of rigidity (bending modulus of elasticity) and surface hardness while giving required impact strength, and in excess of 15%, there is a possibility that the outstanding flowability and chemical resistance inherently possessed by a polypropylene resin composition, is liable to be impaired. The hydrogenated styrene-butadiene-styrene copolymer elastomer (A) may preferably have a melt flow rate (MFR) of 0.8-5.0 g/10 min., particularly 4.5-5.0 g/10 min., as measured at a temperature of 230° C. and a load of 2.16 kg according to JIS K7210. Moreover, it is preferred that the copolymer elastomer (A) is dispersed at an average dispersed particle size of about 500-1500 nm in the polypropylene resin composition.

The hydrogenated styrene-butadiene-styrene copolymer elastomer (B) having a styrene content of 12 to 15% is added to aim at an improvement in scratch resistance of a composition in addition to an improvement in Charpy impact strength. At a styrene content of less than 12%, the decreases of rigidity (bending modulus of elasticity) and surface hardness become large, and in excess of 15%, the effect of improving the scratch resistance will become scarce. The elastomer (B) is used in a proportion of 3 to 10%, preferably 4 to 8%, of the resins in the composition. At less than 3%, the effect of improving the scratch resistance becomes insufficient, and when it exceeds 10%, there is a possibility that the outstanding flowability and chemical resistance of a polypropylene resin composition is liable to be impaired. The hydrogenated styrene-butadiene-styrene copolymer elastomer (B), may preferably have a melt flow rate (MFR) of 4.5-30 g/10 min., particularly 4.5-6.0 g/10 min., as measured at a temperature of 230° C. and a load of 2.16 kg according to JIS K7210. The copolymer elastomer (B) has a low styrene content of 12 to 15% and has an increased content of a polyolefin-like structure portion (polyethylene-butylene block) after hydrogenation of the polybutadiene block, thereby showing enhanced mutual solubility and dispersibility in the polypropylene resin composition. As a result, a characteristic of the copolymer elastomer (B) is that it is dispersed in a particle size of about 10-50 nm which is substantially smaller than the average dispersion particle size of the copolymer elastomer (A). Further, the copolymer elastomer (B) forms a compound structure or a micelle structure in which the increased soft polyolefin-like structure portion (polyethylene-butylene block) covers a hard polystyrene block, to exhibit an increased dispersibility in the polypropylene matrix, whereby the resultant polypropylene resin composition is caused to show a somewhat elastic and slimy surface touch as a whole. Accordingly, the copolymer elastomer (B) exhibits a larger resistance improvement effect than simply predicted by a decreased styrene content (namely, increased rubber content), but if it is added alone to polypropylene resin, the bending modulus of elasticity of the composition becomes insufficient (as shown in Comparative Example 3 appearing hereafter). However, by adding it together with the above-mentioned copolymer elastomer (A), it becomes possible to provide a bending modulus of elasticity which is suitable for automotive interior garnish parts.

The hydrogenated styrene-butadiene-styrene copolymer elastomers (A) and (B) may preferably be used in a total amount of 10 to 25%, particularly 14 to 19%, of the resins (mainly a total amount together with the polypropylene) in the composition. This is because the amount can easily provide a harmony of the melt-moldability, chemical resistance, impact resistance and scratch resistance of the resultant polypropylene resin composition.

<<Other Components>>

Although the polypropylene resin composition of the present invention comprises the above-mentioned polypropylene resin and the hydrogenated styrene-butadiene-styrene copolymer elastomers (A) and (B), as main components, it is possible to add other components, such as other resin, a nucleus agent, a lubricant, an antioxidant, a flame retarder, a thermal stabilizer, weathering stabilizer, a UV absorber, a dispersant, a pigment, an antistatic agent, and a metal deactivator, within an extent of not adversely affecting the harmony of melt-moldability, impact resistance, and scratch resistance, aimed at by the present invention. Examples of optional but especially preferred additives in order to harmonize the impact resistance and scratch resistance of the polypropylene resin composition of the present invention, may include: an organic nucleus agent and a lubricant.
(Organic Nucleus Agent)

An organic nucleus agent is added in order to improve the transparency and rigidity of the polypropylene resin composition, wherein the nucleus agent forms crystallization nuclei and comminutes polypropylene crystals. As organic nucleus agents, organic acids, such as succinic acid, adipic acid, and benzoic acid, metal salts of these organic acids, organic metal phosphates, etc., may be used. Among these, it is particularly preferred to use organic metal phosphates, such as sodium 2,2'-methylene-bis(4,6-di-t-butylphenyl)phosphate, sodium bis(4-t-butyl-phenyl)-phosphate, aluminum dihydroxy-2,2'-methylene-bis(4,6-di-t-butylphenyl)phosphate, aluminum hydroxy-bis[2,2'-methylene-bis(4,6-di-t-butyl phenyl)phosphate], because they have a function of improving mechanical properties, such as a bending modulus of elasticity and hardness, and formability, and also free from development of odor, etc.

Such an organic nucleus agent, may be used in 0.05-0.3 part per 100 parts of the resins including the above-mentioned polypropylene resin and hydrogenated styrene-butadiene-styrene copolymer elastomers (A) and (B), in consideration of the effect of suppressing decrease of impact resistance and cost thereof. Below 0.05 part, the addition effect is scarce, and in excess of 0.3 part, the addition effect is saturated and the impact resistance is rather lowered. Although the organic nucleus agent can also be included in the melt-molding process of the composition containing the polypropylene resin, it is also preferred to melt-knead the nucleus agent with polypropylene resin in advance of the melt-kneading with the hydrogenated styrene-butadiene-styrene copolymer elastomers (A) and (B). In this case, it is preferred to add 0.05-0.4 part, particularly 0.07-0.3 part, to 100 parts of polypropylene resin.
(Lubricant)

Lubricant can be added to the polypropylene resin composition of the present invention, in order to improve the surface slippability of the polypropylene resin composition or a molded product thereof, thereby indirectly improving the scratch resistance. Fatty acid soap, metallic soap, paraffin wax, hydrocarbon oil, fatty alcohol, low-molecular-weight polyethylene, fatty acid amide, fatty acid ester, etc., may be used, and a fatty acid amide lubricant is particularly preferred because of a large lubricant effect and little decrease in impact resistance. Fatty acid amide lubricants, such as an erucic acid amide, oleic acid amide, and stearic acid amide, are preferred, and erucic acid amide is most preferred.

The lubricant is added in 0.2-0.4 part to 100 parts of the resins including the polypropylene and the styrene copolymer elastomers. The addition effect is scarce with less than 0.2 part, and the addition effect is saturated in excess of 0.4 part.

In order to use the polypropylene resin composition of the present invention as a composition for shaping of a coating-free colored part article, it is further required to incorporate colorants, such as various pigments. In this case, it is also preferred to add a UV absorber or a light stabilizer, such as a hindered phenol antioxidant, a phosphorus-containing thermal stabilizer, a hindered amine light stabilizer, and a benzotriazole UV absorbent, for the preventing discoloration of the colored resin. However, the inclusion of inorganic fillers, such as talc, other than a colorant, tends to obstruct the color tone of the colored composition, and is thus not preferred.
(Composition)

The polypropylene resin composition of the present invention can be formed by melt-kneading the above-mentioned components, e.g., at 190-230° C., by means of kneading machines, such as a single-screw extruder, a twin-screw extruder, a Banbury mixer, a roll mixer, and a kneader. In view of productivity, it is preferred to use a twin-screw kneading extruder.

EXAMPLES

Hereinbelow, the present invention will be described more specifically based on Examples and Comparative Examples. The properties described herein including those described below are based on measured values according to the following methods.
1) Scratch Resistance Scratch resistance was measured and evaluated in terms of a lightness difference ($\Delta L^*$) due to whitening and a residual scratch depth of a shaped test piece surface before and after a crosscut(or grid)-pattern test according to JIS K5600 applied to an injection-molded piece (t=3.0 mm in thickness; plate with a mirror surface) of a polypropylene resin composition within 48 to 72 hours after the melt molding.

More specifically, an automatic crosscut (grid-pattern) testing machine (No. 551) specified by JIS K5600 was used to scratch an injection-molded piece with a sapphire-made stylus with a tip angle of 60 degrees and a tip curvature radius (R) of 0.3 mm under a load of 450 g to form a grid (or crosscut) pattern with a spacing between lines of 1 mm and number of scratch lines of 11×11, a lightness-difference $\Delta L^*$ (increase in $L^*$) due to whitening of the molded piece surface before and after the crosscutting was measured and evaluated with a spectrocolorimeter ("CM2600d", made by Minolta Co., Ltd.) according to JIS Z8722. When lightness-difference $\Delta L^*$ in the crosscut test is 0.5 or less, corresponding to a degree of whitening which cannot be confirmed with naked eyes, the scratch resistance is judged to be good. Further, a scratch depth on the molded piece surface after the crosscutting was measured by surface roughness meter ("50SMC2 N-K", made by Taylor-Hobson). A scratch depth of at most 2.0 μm is preferred.
2) Impact Resistance A Charpy impact strength (23° C.) was evaluated according to ISO 179:1993 with a type A notch (ISO179/1eA). A Charpy impact strength of at least 10 kJ/m$^2$ is preferred.
3) Bending Modulus of Elasticity Measured according to ISO0178:1993. A bending modulus of elasticity of at least 1400 MPa is suitable for automotive interior garnish parts.
4) Rockwell Hardness Measured according to ISO 2039/2-87 (R scale). A Rockwell hardness of at least 80 is preferred.
5) Transparency:

According to JIS K7105, a haze value was measured by using a haze computer ("HZ-2", made by Suga Test Instruments Co., Ltd.). An injection-molded piece with a sheet thickness t=2 mm was used as a test specimen. A haze value exceeding 90% is not preferred for use as interior garnish parts.

The injection-molded pieces used for evaluation of the above-mentioned-properties were prepared by kneading a polypropylene resin composition by a twin-screw extruder (made by Kobe Steel, Ltd.; a screw diameter (D)=32-mm and a length L/D ratio=44) under the conditions of a cylinder temperature of 200°, and a discharge rate of 15 kg/h and subsequent injection molding at a molding temperature of 200°. Test pieces for only the scratch-resistance examination were prepared by using polypropylene resin composition samples as will be described later after inclusion therein a luminous aluminum powder with an average particle diameter of 20 μm at a ratio of 1 part per 100 parts of a resin composition.

6) Average Dispersed Particle Size of Hydrogenated Styrene-Butadiene-Styrene Copolymer Elastomer From an injection-molded product for evaluation of the above-mentioned properties, an ultrathin slice of a surface portion parallel to the machine direction of resin at the time of molding was cut out by an ultramicrotome and dyed with ruthenium tetraoxide, followed by photographing through a transmission electron microscope (TEM) to obtain pictures at a magnification of 10000 times. For each dispersed particle on the pictures, a dispersed particle size was determined as (longer axis+shorter axis)/2. One hundred particles having average particle sizes falling within a range of the maximum to maximum/10 were taken, and an arithmetic mean value of the dispersed particle sizes of the one hundred particles was determined as an average dispersed particle size.

<Hydrogenated Styrene-Butadiene-Styrene Copolymer Elastomers>

In order to form polypropylene resin compositions of Examples and Comparative Examples described later, the following various hydrogenated styrene-ethylene-butylene-styrene copolymers (SEBS), were used.

SEBS(A1): "TUFTEC H1062" made by Asahi Kasei Chemicals Corporation (styrene content=18%, MFR=4.5 g/10 min., average dispersed particle size=about 500 nm)

SEBS(A2): "TUFTEC H1041" made by Asahi Kasei Chemicals Corporation (styrene content=30%, MFR=5.0 g/10 min., average dispersed particle size=about 1000 nm)

SEBS(A3): "TUFTEC H1051" made by Asahi Kasei Chemicals Corporation (styrene content=42%, MFR=0.8 g/10 min., average dispersed particle size=about 1000 nm)

SEBS(B1): "TUFTEC H1221" made by Asahi Kasei Chemicals Corporation (styrene content=12%, MFR=4.5 g/10 min., average dispersed particle size=about 20 nm)

SEBS(B2): "DYNARON 8600P" made by JSR, Inc. (styrene content=15%, MFR=30 g/10 min., average dispersed particle size=about 20 nm)

SEBS(C): "DYNARON 9901P" made by JSR, Inc. (styrene content=53%, MFR=3.3 g/10 min.)

Example 1

85 parts of homo-polypropylene containing about 0.1% of nucleus agent (hereafter coded as "h-PP") ("J137M" made by Prime Polymer Co., Ltd.; bending modulus of elasticity=2250 MPa, Charpy-impact-strength (23° C.)=1.1 kJ/m2, Haze (t=2 mm)=58.7%), 10 parts of SEBS(A2) (styrene content: 30%), 5 parts of SEBS (B1) (styrene content: 12%) and 0.2 part of a lubricant (erucic acid amide; "NEUTRON S" made by Nippon Fine Chemical Co., Ltd.) were blended by a Henschel mixer, and the resultant powder blend was kneaded by a twin-screw extruder (made by Kobe Steel, Ltd.; a screw diameter (D)=32-mm, a length L/D ratio=44) at a cylinder temperature of 200° C. and a discharge rate of 15 kg/h and pelletized, followed by injection molding at a molding temperature of 200° C. to obtain test pieces for evaluation of respective items as described above.

Separately, the above-mentioned powder blend was further blended with one part of luminous aluminum powder with an average particle size of 20 μm, followed by melt-kneading and injection molding in the same manner as described above to obtain test pieces for the scratch-resistance evaluation.

The test pieces for evaluation obtained in this way were subjected to evaluation of a bending modulus of elasticity, a Charpy impact strength, Rockwell hardness, a scratch resistance, and transparency (haze) according to the above-described methods.

The results are inclusively shown in Tables 1 and 2 appearing hereinafter together with the results of the following Examples, Comparative Examples and Reference Example.

Examples 2-7

Polypropylene resin compositions were prepared and evaluated in the same manner as in Example 1 except for changing the types and/or ratios of polypropylene (h-PP), SEBS (A) and SEBS (B) as shown in Table 1.

Reference Example

Test pieces for evaluation were prepared and evaluated in the same manner as in Example 1 except for using a commercially available AES resin ("W251" made by Techno Polymer Co., Ltd.; Melt flow rate (MFR)=9 g/10 min. measured at 220° C. and a load of 10 kg) instead of the polypropylene resin composition used in Example 1.

The evaluation results of an above-mentioned Examples and Reference Example are collectively shown in Table 1 appearing at the end.

Comparative Examples 1-3

Three types of polypropylene resin compositions were obtained and evaluated in the same manner as in Example 1 except for using 15% each of SEBS (A1) (18% of styrene content), SEBS(A2) (styrene content: 30%) and SEBS (B1) (styrene content: 12%), independently, instead of the combination of 10% of SEBS(A2) (styrene content: 30%) and 5% of SEBS(B1) (styrene content: 12%) used in Example 1.

Comparative Example 4

A polypropylene resin composition was prepared and evaluated in the same manner as in Example 1 except for using 10% of SEBS (C) (styrene content: 53%) instead of 10% of SEBS(A2) (styrene content: 30%).

The results of the above-mentioned Comparative Examples are collectively shown in Table 2 at the end in parallel with the results of Example 1 and Reference Example. Among the characteristic values shown in Table 2, those which are inappropriate for interior garnish parts are noted by adding "*".

INDUSTRIAL APPLICABILITY

The results in Tables 1 and 2 show that Compositions obtained by adding SEBS (A) having a high styrene content and SEBS (B) having a low styrene content independently to polypropylene resin are each not satisfactory in respect of impact resistance (Comparative Examples 1 and 2) or bending modulus of elasticity (Comparative Example 3), whereas the addition of SEBS (A) and SEBS (B) in combination makes a good balance of these properties and provides polypropylene resin compositions which have a good transparency as represented by a low haze value and excellent properties suitable for coating-free colored materials. Particularly, compared with an AES resin which is excellent in adaptability to coating-free coloring but is accompanied with difficulty in melt-moldability, the polypropylene resin composition of the present invention has a bending modulus of elasticity which is somewhat low but sufficient for automotive garnish parts, and a better scratch resistance in spite of somewhat low surface hardness (Rockwell hardness), thus providing a polypropylene resin composition which is extremely suitable as a molding material for coating-free colored parts in combination with its inherently excellent melt-moldability.

By using such excellent impact resistance, scratch-resistance and melt-moldability, the polypropylene resin composition of the present invention is not only extremely suitable as a resin material for coating-free automotive resin parts, such as an instrument panel garnish, a door trim garnish, and a shift garnish, but also suitable for providing a good harmony of aesthetic appearance and the scratch resistance to coat-less automotive parts, such as a bumper and a trim, and further suitable as resin molding materials for home interior resin articles for which the abovementioned harmony of properties is desired.

wherein the composition is free from inorganic fillers other than a colorant, and the composition exhibits a bending modulus of elasticity of at least 1400 MPa and a Rockwell hardness of at least 80.

2. A polypropylene resin composition according to claim 1, wherein the hydrogenated styrene-butadiene-styrene copolymer elastomer (A) is dispersed at an average particle size of 50-1500 nm and the hydrogenated styrene-butadiene-styrene copolymer elastomer (B) is dispersed at an average particle size of 10-50 nm, in the polypropylene resin as matrix.

3. A polypropylene resin composition according to claim 1, wherein 0.05-0.4 wt. part of an organic nucleus agent is contained per 100 wt. parts of resin components including the polypropylene resin, and the hydrogenated styrene-butadiene-styrene copolymer elastomers (A) and (B).

TABLE 1

| | Resin species | | Example 1 | Example 2 | Example 3 | Example 4 | Example 5 | Example 6 | Example 7 | Reference Example |
|---|---|---|---|---|---|---|---|---|---|---|
| Resin composition (wt. %) | Polypropylene | h-PP | 85 | 83 | 81 | 85 | 83 | 84 | 80 | |
| | SEBS (St content) | A1(18%) | | | | 10 | | | | |
| | | A2(30%) | 10 | 10 | 12 | | | 9 | 12 | |
| | | A3(42%) | | | | | 11 | | | |
| | | B1(12%) | 5 | 7 | 7 | 5 | 6 | | | |
| | | B2(15%) | | | | | | 7 | 8 | |
| | Others | AES | | | | | | | | 100 |
| [Test item] | | | | | | | | | | |
| Bending modulus of elasticity | | MPa | 1610 | 1520 | 1460 | 1560 | 1520 | 1680 | 1490 | 2300 |
| Charpy impact strength | 23° C. | kJ/m2 | 12 | 25 | 26 | 14 | 15 | 16 | 37 | 12 |
| Rockwell hardness | — | HRR | 94 | 90 | 88 | 90 | 94 | 92 | 86 | 100 |
| Scratch resistance | ΔL* | — | | 0.095 | 0.01 | — | 0.385 | — | — | — | 0.78 |
| | Scratch depth | um | 1.4 | 1.4 | 1.3 | 1.6 | 1.3 | 1.4 | 1.8 | 3.8 |
| Haze | t = 2 mm | % | 68 | 64 | 64 | 81 | 81 | 70 | 68 | 87 |

TABLE 2

| | Resin species | | Example 1 | Comp. Example 1 | Comp. Example 2 | Comp. Example 3 | Comp. Example 4 | Reference Example |
|---|---|---|---|---|---|---|---|---|
| Resin composition (wt. %) | Polypropylene | h-PP | 85 | 85 | 85 | 85 | 85 | |
| | SEBS (St content) | A1(18%) | | 15 | | | | |
| | | A2(30%) | 10 | | 15 | | | |
| | | B1(12%) | 5 | | | 15 | 5 | |
| | | C(53%) | | | | | 10 | |
| | Others | AES | | | | | | 100 |
| [Examination item] | | | | | | | | |
| Bending modulus of elasticity | | MPa | 1610 | 1750 | 1800 | *1100 | 1690 | 2300 |
| Charpy impact strength | 23° C. | kJ/m2 | 12 | *7 | *6 | 38 | *6.5 | 12 |
| Rockwell hardness | — | HRR | 94 | 95 | (96) | (80) | 84 | 100 |
| Scratch resistance | ΔL* | — | | 0.095 | *(0.8) | (0.3) | (0.05) | — | *0.78 |
| | Scratch depth | um | 1.4 | *(4.5) | *(2.6) | *(2.1) | — | *3.8 |
| Haze | t = 2 mm | % | 68 | *(89) | (64) | (60) | *95 | 87 |

Notes:
Numbers in parentheses indicate that they are interpolation values between measured values.

The invention claimed is:

1. A polypropylene resin composition, comprising: 75-90 wt. % of polypropylene resin, 7-15 wt. % of hydrogenated styrene-butadiene-styrene copolymer elastomer (A) having a styrene content of 18-42 wt. %, and 3-10 wt. % of hydrogenated styrene-butadiene-styrene copolymer elastomer (B) having a styrene content of 12-15 wt. %, 4. A polypropylene resin composition according to claim 1, wherein 0.1-0.4 wt part of a lubricant is contained per 100 wt. parts of resin components including the polypropylene resin, and the hydrogenated styrene-butadiene-styrene copolymer elastomers (A) and (B).

5. A polypropylene resin composition according to claim 1, further containing a colorant.

6. A polypropylene resin composition according to claim 5, wherein the colorant is luminous aluminum powder.

7. A coating-free automotive interior part, comprising a polypropylene resin composition according to claim 1.

8. A coating-free automotive interior part according to claim 7, which is selected from an instrument panel garnish, a door trim garnish, and a shift garnish.

* * * * *